United States Patent
O'Sullivan et al.

(10) Patent No.: US 10,699,242 B2
(45) Date of Patent: Jun. 30, 2020

(54) AUTOMATED SURFACING OF TAGGED CONTENT ADJUNCT TO VERTICAL APPLICATIONS

(75) Inventors: Patrick J. O'Sullivan, Dublin (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 1817 days.

(21) Appl. No.: 12/015,270

(22) Filed: Jan. 16, 2008

(65) Prior Publication Data

US 2009/0183082 A1 Jul. 16, 2009

(51) Int. Cl.
*G06F 3/048* (2013.01)
*G06Q 10/10* (2012.01)

(52) U.S. Cl.
CPC .................................. *G06Q 10/10* (2013.01)

(58) Field of Classification Search
USPC ........................................ 715/205–208, 802
See application file for complete search history.

(56) References Cited

U.S. PATENT DOCUMENTS

| | | | |
|---|---|---|---|
| 6,725,227 B1 | 4/2004 | Li | |
| 7,133,862 B2* | 11/2006 | Hubert et al. | |
| 7,421,645 B2* | 9/2008 | Reynar | 715/206 |
| 7,747,937 B2* | 6/2010 | Rojer | 715/206 |
| 7,788,590 B2* | 8/2010 | Taboada et al. | 715/761 |
| 7,844,891 B2* | 11/2010 | Chandra | 715/208 |
| 2002/0069218 A1 | 6/2002 | Sull et al. | |
| 2003/0101413 A1* | 5/2003 | Klein et al. | 715/513 |
| 2004/0187074 A1 | 9/2004 | Keohane et al. | |
| 2004/0205694 A1 | 10/2004 | James et al. | |
| 2004/0260702 A1* | 12/2004 | Cragun | G06F 17/30873 |
| 2005/0060162 A1* | 3/2005 | Mohit | G06F 17/30855 705/1.1 |
| 2005/0268219 A1* | 12/2005 | Roma i Dalfo | 715/512 |
| 2006/0230333 A1* | 10/2006 | Racovolis et al. | 715/500.1 |

(Continued)

OTHER PUBLICATIONS

Paul McFedries, "Folk Wisdom", Feb. 2006, IEEE Spectrum, http://spectrum.ieee.org/telecom/internet/folk-wisdom.*

(Continued)

*Primary Examiner* — Matthew Ell
(74) *Attorney, Agent, or Firm* — L. Jeffrey Kelly

(57) ABSTRACT

Embodiments of the present invention address deficiencies of the art in respect to social bookmarking and provide a method, system and computer program product for automated surfacing of tagged content adjunct to a vertical application. In an embodiment of the invention, a method for automatically surfacing tagged content in a vertical application can be provided. The method can include receiving and parsing text from content in an end user application, comparing the parsed text to social bookmarks and associated metadata from a social bookmarking system and matching portions of the content to respective ones of the social bookmarks and associated metadata based upon the comparison, and directing a visual emphasis of the matched portions of the content in the end user application, whereby the end user application is unmodified to perform the receiving, comparing and directing steps.

14 Claims, 2 Drawing Sheets

(56) References Cited

U.S. PATENT DOCUMENTS

| | | |
|---|---|---|
| 2007/0073652 A1* | 3/2007 | Taboada et al. .................. 707/3 |
| 2007/0143330 A1 | 6/2007 | Tang |
| 2007/0150930 A1 | 6/2007 | Koivisto et al. |
| 2008/0072145 A1* | 3/2008 | Blanchard ............... G06F 17/22 715/273 |
| 2008/0104073 A1* | 5/2008 | Gorelick ............ G06Q 30/0251 |
| 2008/0125892 A1 | 5/2008 | Hoguet |
| 2008/0162275 A1 | 7/2008 | Logan et al. |
| 2008/0201651 A1* | 8/2008 | Hong ............... G06F 17/30864 715/764 |
| 2008/0263135 A1 | 10/2008 | Olliphant |
| 2009/0006304 A1 | 1/2009 | Ma et al. |
| 2009/0063265 A1 | 3/2009 | Normula |
| 2009/0083326 A1 | 3/2009 | Pelton |
| 2009/0094189 A1 | 4/2009 | Stephens |
| 2009/0100169 A1 | 4/2009 | Allen et al. |
| 2013/0167168 A1 | 6/2013 | Ellis et al. |

OTHER PUBLICATIONS

Peter Hoschka, "CSCW Research at GMD-FIT: From Basic Groupware to the Social Web", Aug. 1998, SIGGROUP Bulletin, vol. 19, No. 2, p. 8.*

"Knowledge Pump: Supporting the Flow and Use of Knowledge", Natalie Glance et al, Oct. 10, 1997.*

"Finding unknown interests utilizing the wisdom of crowds in a social bookmark service" by Kei Shiratsuchi et al.*

"GiveALink: Mining a Semantic Network of Bookmarks for Web Search and Recommendation" by Lubomira Stoilova et al.*

"Pull technology" by Wikipedia Sep. 22, 2007.*

"What is 'Push Technology'?" Prepared by Kenneth W. Umbach, Ph.D., California Research Bureau, California State Library, CRB Note vol. 4 No. 6 Oct. 1997 (Year: 1997).*

\* cited by examiner

AUTOMATED SURFACING OF TAGGED CONTENT ADJUNCT TO VERTICAL APPLICATIONS

REFERENCE TO CO-PENDING APPLICATIONS FOR PATENT

The present application is related to the following co-assigned U.S. Patent Applications, which are expressly incorporated by reference herein:

U.S. application Ser. No. 12/015,245, entitled "AUTOMATED SURFACING OF TAGGED CONTENT IN VERTICAL APPLICATIONS," filed on Jan. 16, 2008.

BACKGROUND OF THE INVENTION

Field of the Invention

The present invention relates to the field of bookmarking content and more particularly to social bookmarking.

Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In operation, a social bookmarking system, users save links to memorable content. Unlike traditional bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information rather than merely storing bookmarks in a traditional file hierarchy. As such, users processing annotations for a social bookmark can view the social bookmark for content along with meta-information pertaining to the bookmark, for instance a number of users having bookmarked the content. Further, some social bookmarking services infer clusters of bookmarks from the relationship of corresponding annotations. Finally, many social bookmarking services provide subscription based feeds for lists of bookmarks, including lists organized by annotations. Consequently, subscribers can become aware of new bookmarks as the bookmarks are saved, shared, and annotated by other users.

Social bookmarking systems often follow an "inward" bookmarking metaphor. The inward bookmarking metaphor provides for the tagging of content in a browser and the storage of the bookmark (and subsequent access of the bookmark) from a central location. Therefore, in the inward bookmarking metaphor, users leave an active application to interact with a different application in order determine topical or interesting knowledge provided by social bookmarks. The "outward" bookmarking metaphor recognizes the clumsiness of the inward bookmarking metaphor and provides several tools for propogating social bookmarking knowledge into the active application. Examples include tag clouds enabled to bring users to a central bookmarking system or to draw information from a central bookmarking system from within an active application.

BRIEF SUMMARY OF THE INVENTION

Embodiments of the present invention address deficiencies of the art in respect to social bookmarking and provide a novel and non-obvious method, system and computer program product for automated surfacing of tagged content adjunct to a vertical application. In an embodiment of the invention, a method for automatically surfacing tagged content adjunct to a vertical application can be provided. The method can include receiving and parsing text from content in an end user application, comparing the parsed text to social bookmarks and associated metadata from a social bookmarking system and matching portions of the content to respective ones of the social bookmarks and associated metadata based upon the comparison, and directing a visual emphasis of the matched portions of the content in the end user application, whereby the end user application is unmodified to perform the receiving, comparing and directing steps.

In one aspect of the embodiment, comparing the parsed text to social bookmarks and associated metadata from a social bookmarking system and matching portions of the content to respective ones of the social bookmarks and associated metadata based upon the comparison further can include restricting the parsed text to a limited vocabulary when comparing the parsed text to the social bookmarks. In another aspect of the embodiment, the method further can include directing the toggling of the visual emphasis of the matched portions of the content in the end user application. In yet another aspect of the embodiment, the method further can include directing an appendage of a source indicator for the visually emphasized matched portions of the content.

In another embodiment of the invention, a social bookmarking data processing system can be provided. The system can include auto-surfacing logic coupled to but separately executing from an end user application executing in an end user computing device, and also a social bookmarking system executing in a host server and managing a set of bookmarks. The logic can include program code enabled to receive the content from the display, to parse the content into text for comparing to the social bookmarks, to match portions of the content to respective ones of the social bookmarks and associated metadata based upon the comparison, and to direct a visual emphasis of the matched portions of the content in the end user application, whereby the end user application is unmodified by the logic.

In one aspect of the embodiment, the auto-surfacing logic subclasses a display event in the end user application. In another aspect of the embodiment, the auto-surfacing logic is a helper application coupled to the end user application. In yet another aspect of the embodiment, the auto-surfacing logic resides in the end user computing device. Finally, in even yet another aspect of the embodiment, the auto-surfacing logic resides in the host server and has a hook into the end user application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the automated surfacing of tagged content in a vertical application. In accordance with an embodiment of the present invention, content in an end user application can be compared with established social bookmarks and associated metadata in a social bookmarking system. Portions of the content known to be associated with one or more of the established social bookmarks and associated metadata can be identified and visually distinguished within the end user application. In this way, the content of the end user application can be integrated with the social bookmarking system without requiring the end user to refer separately to the social bookmarking system. Notably, the act of comparing the content to the established social bookmarks and associated metadata, and the identification of content associated with the social bookmarks and associated metadata can be performed adjunct to and separate from the end user application so that the end user application need not be modified.

Figure 1:
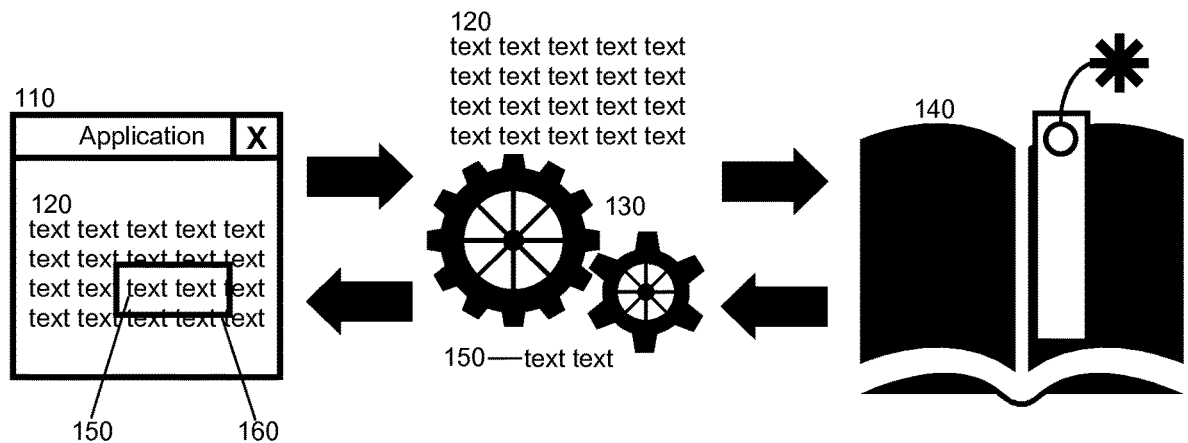
FIG. 1 is a pictorial illustration of a process for the automated surfacing of tagged content in a vertical application.

In illustration, FIG. 1 pictorially depicts a process for the automated surfacing of tagged content in a vertical application. As shown in FIG. 1, an end user application 110 can provide a display of content 120. The end user application 110 can be communicatively coupled to a social bookmarking system 140 through a helper application 130. The helper application 130 can pull the content 120 from the end user application and pass the same to the social bookmarking system 140 for comparison with one or more established social bookmarks and associated metadata. Thereafter, portions 150 of the content 120 associated with established social bookmarks and associated metadata in the social bookmarking system 140 can be provided visual emphasis 160 in the end user application 110.

Figure 2:
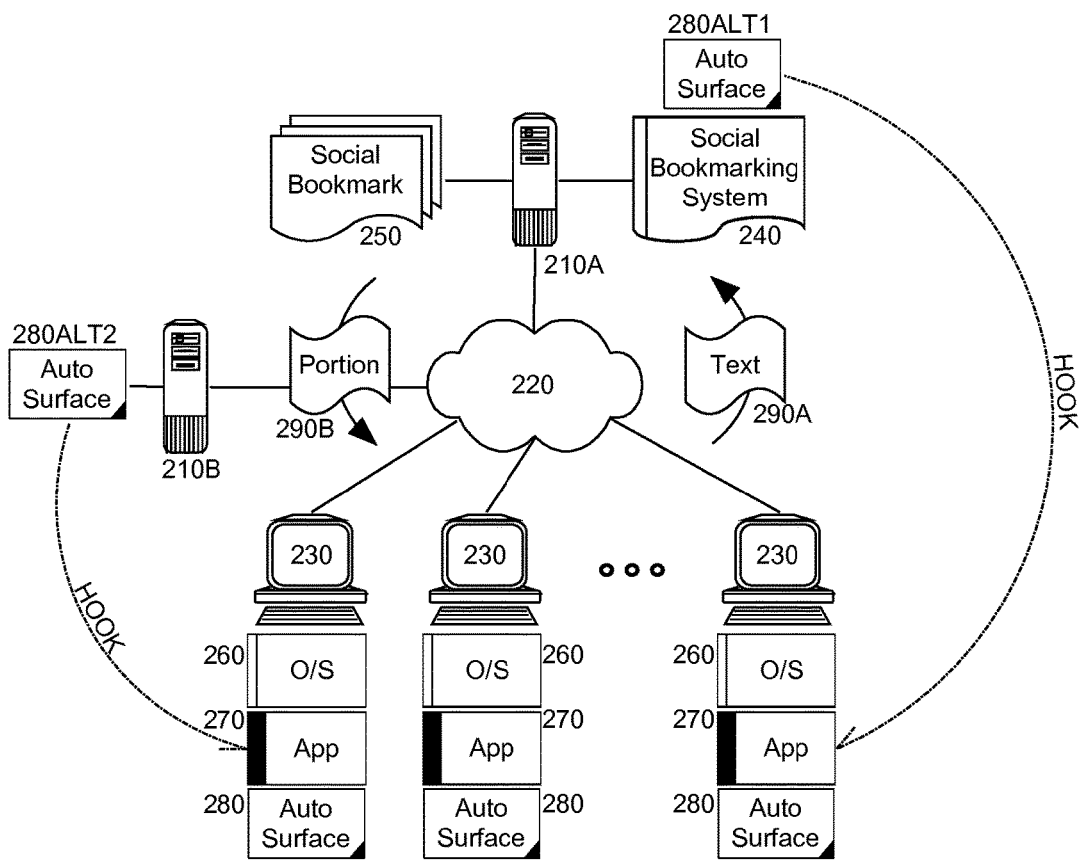
FIG. 2 is a schematic illustration of a social bookmarking data processing system configured for automated surfacing of tagged content in a vertical application; and, FIG. 3 is a flow chart illustrating a process for automated surfacing of tagged content in a vertical application.

The process of FIG. 1 can be performed within a social bookmarking data processing system. In illustration, FIG. 2 schematically depicts a social bookmarking data processing system configured for automated surfacing of tagged content in a vertical application. The system can include a host server 210A configured for communicative coupling to one or more clients 230 over computer communications network 220. The host server 210A can support the operation of a social bookmarking system 240 managing one or more social bookmarks and associated metadata 250 on behalf of the clients 230.

Each of the clients 230 can include an operating environment 260, for example a virtual machine or operating system. The operating environment 260 further can support the operation of one or more end user applications 270, for example a word processor, spreadsheet, database application, Web browser and the like. Notably, only a single end user application 270 is shown in FIG. 2 for the purpose of illustrative simplicity. In accordance with an embodiment of the invention, auto-surfacing logic 280 can be coupled to or incorporated as part of the end-user application 270. For instance, the auto-surfacing logic 280 can be provided as a helper application, or the auto-surfacing logic 280 can be a sub-class of the event loop for each of the end user applications 270 selected from a list of active applications, trapping and modifying a display event.

The auto-surfacing logic 280 can include program code enabled to detect an attempt to display content in the end-user application 270. In response, the program code can be further enabled to pass the content 290A to the social bookmarking system 240 for comparison with the social bookmarks 250. Portions 290B of the content 290A matching the social bookmarks and associated metadata 250 can be returned to the auto-surfacing logic 280. Thereafter, the program code can be enabled to visually emphasize the portions 290B in the display in the end user application 270. For example, the portions 290B can be proportionately enlarged or more deeply colored or toned in the display of the end user application 270 depending upon a frequency of tagging for a corresponding one of the social bookmarks 250.

Optionally, the program code of the auto-surfacing logic 280 can be disposed in the host server 210A, as server-side auto-surfacing logic 280ALT1. The server-side auto-surfacing logic 280ALT1 can establish a hook into each of the applications 270 in order to pull the content 290A and to visually emphasize the portions 290B of the content 290A matching the social bookmarks and associated metadata 250. As another option, the vocabulary used in matching the content 290A with the social bookmarks 250 can be restricted to limit words and phrases of less value and to avoid cluttering the display of the applications 270. As yet a further option, a source identifier can be provided in the display of the applications 270 for the visually emphasized portions 290B indicating a source of the matched ones of the social bookmarks and associated metadata 250. Finally, the visual emphasis of the portions 290B of the content 290 can be toggled on and off at the discretion of the end user.

In another aspect of the embodiment, the program code of the auto-surfacing logic 280ALT2 can be disposed in separately and apart from the applications 270 either hosted in a separate server 21OB, or as a separate application executing in each of the clients 230 (end user computing devices). As before, the server-side auto-surfacing logic 280ALT2 can establish a hook into each of the applications 270 in order to pull the content 290A and to direct the visual emphasis of the portions 290B of the content 290A matching the social bookmarks and associated metadata 250. The direction of the visual emphasis can be incorporated as a markup language association between the portions 290B of the content 290A and the matched ones of the social bookmarks and associated metadata 250.

Figure 3:
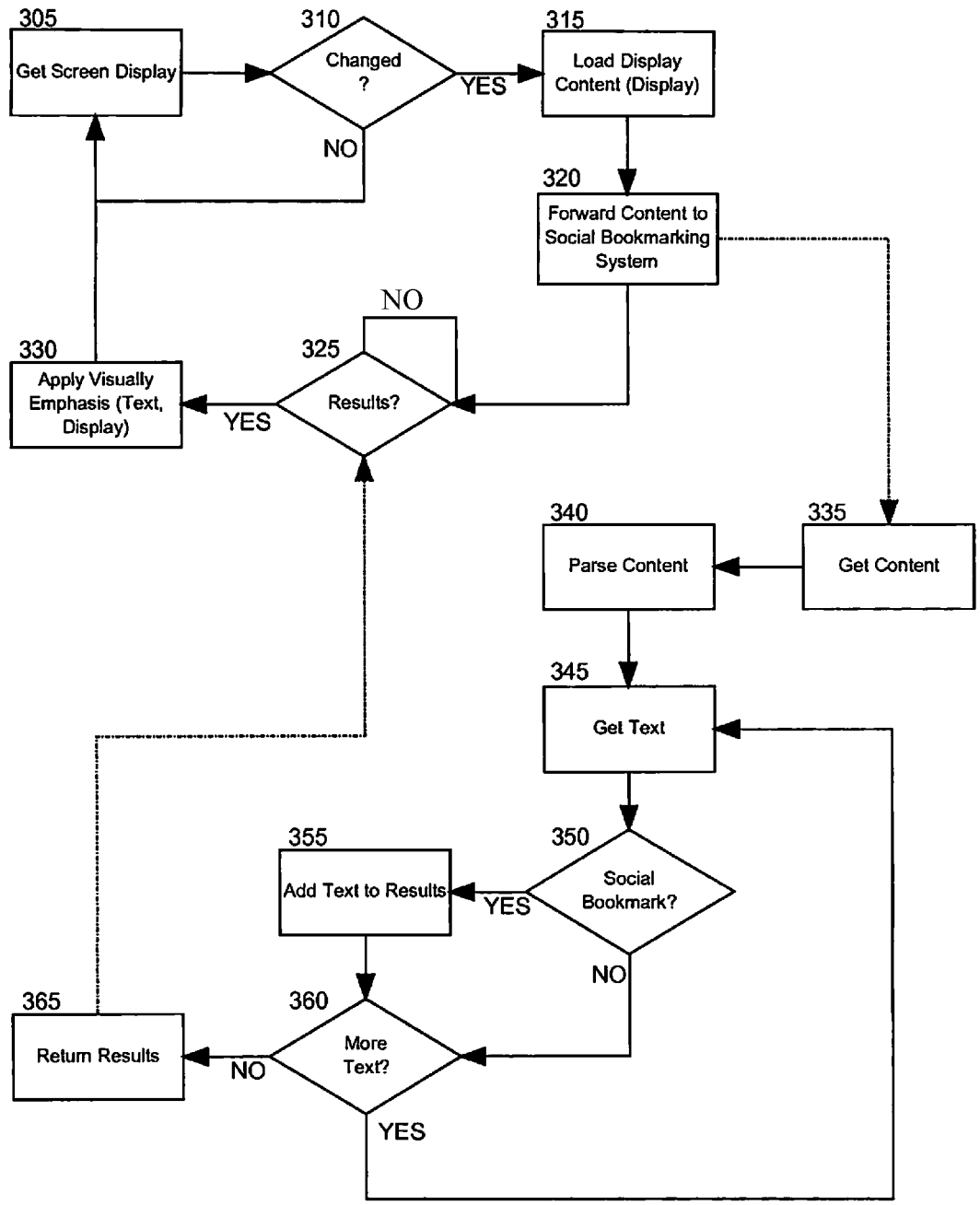

In even yet further illustration, FIG. 3 is a flow chart illustrating a process for automated surfacing of tagged content in a vertical application. Beginning in block 305, a screen display for an end user application can be retrieved and in decision block 310, it can be determined whether the screen display has been updated. If so, in block 315 the display content in the screen display can be loaded and the content can be forwarded to a social bookmarking system in block 320. In block 335, within the social bookmarking system the content can be received and in block 340 the content can be parsed.

In block 345, text can be retrieved from the content. The text can be an individual word or a series of words. In decision block 350, the text can be compared to a set of social bookmarks and associated metadata to determine whether or not the text matches a particular one of the social bookmarks and associated metadata. If so, in block 355, the text can be added to a set of results and, in decision block 360 it can be determined if additional text remains to be compared in the content, or if further comparisons to additional social bookmarks and associated metadata remain to be done. If so, the process can continue through block 345 with additional text. When no further text remains to be processed in the content, in block 365 the results can be returned.

In decision block 325, if it is determined that results have been received from the social bookmarking system, in block 330, the text in the results can be visually emphasized in the display. For instance, the color of the text can be bolder or deeper for text associated with a high frequency of tags for a corresponding social bookmark. Alternatively, the size of the text can be greater for text associated with a high frequency of tags for a corresponding social bookmark. In any event, the process can return to block 305 with the selection of the screen display and the process can repeat for a change in content in the display.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for automatically surfacing tagged content adjunct to a vertical application, the method comprising:
   establishing a hook by auto-surfacing logic executing in a host server into an end-user application in a client computing device in order to pull content from and to direct visual emphasis of portions of the content matching social bookmarks and associated metadata;
   detecting, by the auto-surfacing logic in the host server, an attempt by the client computing device to display content in the end-user application;
   retrieving into the auto-surfacing logic from the client computing device the screen display for the end-user application upon detecting the attempt to display content;
   forwarding the content from the auto-surfacing logic in the host server to a social bookmarking system executing in a memory of a different server, the social bookmarking system saving links to memorable content on the Internet and publishing the links on the Internet for public inspection so as to provide a communal repository of bookmarks;
   receiving, at the auto-surfacing logic in the host server and subsequently forwarding to the client computing device, text from the social bookmarking system resulting from a matching of content parsed from the screen display with words and phrases of one or more social bookmarks in the social bookmarking system; and,
   directing the client computing device to visually emphasize the received text from the content in the end user application by determining a frequency of match of the received text to the at least one social bookmark and adjusting a font size of the received text proportionately based upon the determined frequency of match so as to visually differentiate the received text from the content.

2. The method of claim 1, further comprising toggling the visual emphasis of the received text from the content in the end user application.

3. The method of claim 1, further comprising appending a source indicator in the end user application indicating a particular one of the at least one social bookmark for the visually emphasized received text.

4. The method of claim 1, wherein the frequency of match is a number of occurrences that the received text matches the at least one social bookmark.

5. A social bookmarking data processing system comprising:
auto-surfacing logic coupled to but separate from an end user application executing in an end user computing device, the auto-surfacing logic comprising program code enabled to establishing a hook into the end-user application in order to pull content from and to direct visual emphasis of portions of the content matching social bookmarks and associated metadata, detect, in the end user computing device, an attempt to display content in the end-user application, to retrieve into the auto-surfacing logic from the client computing device the screen display for the end-user application upon detecting the attempt to display content, to forward the content from the auto-surfacing logic in the host server to a social bookmarking system executing in a memory of a different server, the social bookmarking system saving links to memorable content on the Internet and publishing the links on the Internet for public inspection so as to provide a communal repository of bookmarks, the social bookmarking system additionally organizing and permitting searching of the bookmarks collectively established by users within a social group, to receive matched text from the social bookmarking system resulting from a matching of content parsed from the screen display with words and phrases of one or more social bookmarks in the social bookmarking system, and to direct the client computing device to visually emphasize the received matched text from the content in the end user application by determining a frequency of match of the received matched text to the at least one social bookmark and associated metadata and adjusting a font size of the received matched text proportionately based upon the determined frequency of match so as to visually differentiate the received matched text from the content;
the social bookmarking system executing in a host server and managing a plurality of social bookmarks, the social bookmarking system comprising program code enabled to receive content from the end user computing device, to parse the content into text, to compare the parsed text to a plurality of social bookmarks and associated metadata to determine whether the parsed text matches at least one of the plurality of social bookmarks in the social bookmarking system by matching portions of the parsed text to respective ones of the plurality of social bookmarks and associated metadata, and to forward the parsed text determined to match the at least one of the plurality of social bookmarks to the end user computing device as the matched text.

6. The system of claim 5, wherein the auto-surfacing logic subclasses a display event in the end user application.

7. The system of claim 5, wherein the auto-surfacing logic is a helper application coupled to the end user application.

8. The system of claim 5, wherein the auto-surfacing logic rather then executing in the end user computing device executes in the host server and has a hook into the end user application.

9. The system of claim 5, wherein the program code of the social bookmarking system enabled to compare the parsed text to the plurality of social bookmarks and associated metadata to determine whether the parsed text matches at least one of the plurality of social bookmarks in the social bookmarking system by matching portions of the parsed text to respective ones of the plurality of social bookmarks and associated metadata further comprises program code to restrict the parsed text to a limited vocabulary when comparing the parsed text to the plurality of social bookmarks and associated metadata.

10. The system of claim 5, wherein the frequency of match is a number of occurrences that the received matched text matches the at least one social bookmark and associated metadata.

11. A computer program product comprising a non-transitory computer usable storage medium storing computer usable program code for automatically surfacing tagged content adjunct to a vertical application, the computer program product comprising:
computer usable program code for establishing a hook by auto-surfacing logic executing in a host server into an end-user application in a client computing device in order to pull content from and to direct visual emphasis of portions of the content matching social bookmarks and associated metadata;
computer usable program code for detecting, by the auto-surfacing logic in the host server, an attempt by the client computing device to display content in the end-user application;
computer usable program code for retrieving into the auto-surfacing logic from the client computing device the screen display for the end-user application upon detecting the attempt to display content;
computer usable program code for forwarding the content from the auto-surfacing logic in the host server to a social bookmarking system executing in a memory of a different server, the social bookmarking system saving links to memorable content on the Internet and publishing the links on the Internet for public inspection so as to provide a communal repository of bookmarks;
computer usable program code for receiving, at the auto-surfacing logic in the host server and subsequently forwarding to the client computing device, text from the social bookmarking system resulting from a matching of content parsed from the screen display with words and phrases of one or more social bookmarks in the social bookmarking system, and
computer usable program code for directing the client computing device to visually emphasize the received text from the content in the end user application by determining a frequency of match of the received text to the at least one social bookmark and adjusting a font size of the received text proportionately based upon the determined frequency of match so as to visually differentiate the received text from the content.

12. The computer program product of claim 11, further comprising computer usable program code for toggling the visual emphasis of the received text from the content in the end user application.

13. The computer program product of claim 11, further comprising computer usable program code for appending a source indicator in the end user application indicating a particular one of the at least one social bookmark for the visually emphasized received text.

14. The computer program product of claim 11, wherein the frequency of match is a number of occurrences that the received text matches the at least one social bookmark.

* * * * *